J. Powell,
Basin Faucet.
N° 23,310.   Patented Mar. 22, 1859.

Witnesses
Geo. W. Dwight
Thomas Kile

Inventor
James Powell

UNITED STATES PATENT OFFICE.

JAMES POWELL, OF CINCINNATI, OHIO.

FAUCET.

Specification forming part of Letters Patent No. 23,310, dated March 22, 1859; Reissued July 5, 1859, No. 753.

*To all whom it may concern:*

Be it known that I, JAMES POWELL, of Cincinnati, in the county of Hamilton and State of Ohio, have invented a new and useful Improvement in Faucets; and I hereby declare the following to be a full and exact description of the same, reference being had to the accompanying drawings, making part of this specification.

The said invention relates chiefly to a peculiar arrangement of mechanism, for opening, closing, and guiding the valve.

Figure 1:
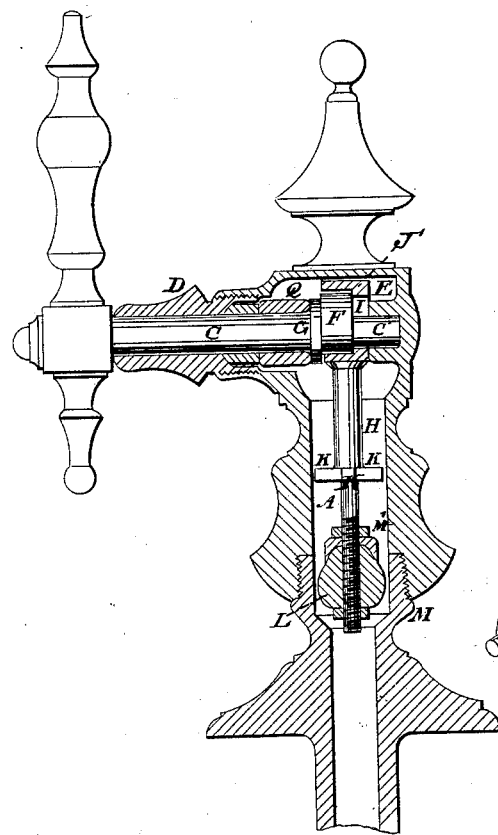
Figure 2:
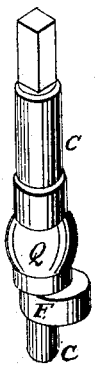

In the accompanying drawings Figure 1, is an axial section of the valve chamber parallel with the operating stem. Fig. 2, is a detached view of the two stems.

A, is the valve chamber.

C is the operating stem, which stem is confined by a suitable guide cap D, and terminates in a pivot c, which occupies a socket E, in the chamber B.

F, is a cam or eccentric on the stem C, for operating the valve stem H, as hereafter explained.

G, is a collar on the stem C, which acts in connection with a cushion Q, to confine the pivot c, within its socket.

The valve stem H, has a flattened head I, which flattened portion is slotted longitudinally (i) so as to receive the pivot c, of the stem C, which is thus made effective to prevent the displacement of the head I, in two directions while it is held in the other two directions by being confined as shown between the socket E and cam F. The longitudinal motion necessary to open and close the valve is imparted to the valve stem through the medium of two flanges J and J' on its head I, engaging on each side with the cam F.

K, K, K, are spurs or projections on the valve stem H, which serve to confine it to an accurately central position within the chamber A, and guide the valve to its seat in the act of closing.

The valve L, is of india rubber and is adjustable on its stem by means of a pair of screw nuts or collars M, M', which supply the place of the customary nut and fast collar.

This valve cock can be made at a much less expense than those now in use, is less liable to derangement and is easily repaired without detaching the supply pipe. The valve is operated with great facility, the cam having no stop pins or other restriction to its sweep nor any one arbitrary point it must assume in order to close or to open the passage, the cock being effectually closed at any point of one third of the rotation of the cam stem and as effectually opened at any point of the other two thirds of its circuit. The peculiar arrangement of the operative parts dispenses with the necessity of spring connecting screws or pins to hold the valve stem in position. The cam being confined at its periphery only by the yoke which it touches at two opposite points only, can be easily withdrawn for inspection, cleansing or repair of the cock. It works with the least possible friction, and the dimensions of the yoke are such as not to involve any unsightly swelling of the chamber at this part. The closing of the valve is gradual and obviates the injurious concussion and reaction which are common with valves which close in the same direction in which the water flows.

The adjustable shoulders M, M', enable the valve to be set up as it wears so as to dispense with the necessity of a new plug and the parts do not require to be made with the mechanical precision which is necessary when one shoulder of the plug or valve is a fixture.

I claim as new and of my invention and desire to secure by Letters Patent:

The described arrangement of the cam F, flanges J and J', longitudinal slot i, and spurs K, combined and operating in the manner and for the purposes set forth.

In testimony of which invention, I hereunto set my hand.

JAMES POWELL.

Witnesses:
 GEO. H. KNIGHT,
 HENRY POWELL.

[FIRST PRINTED 1911.]